Figure 1:
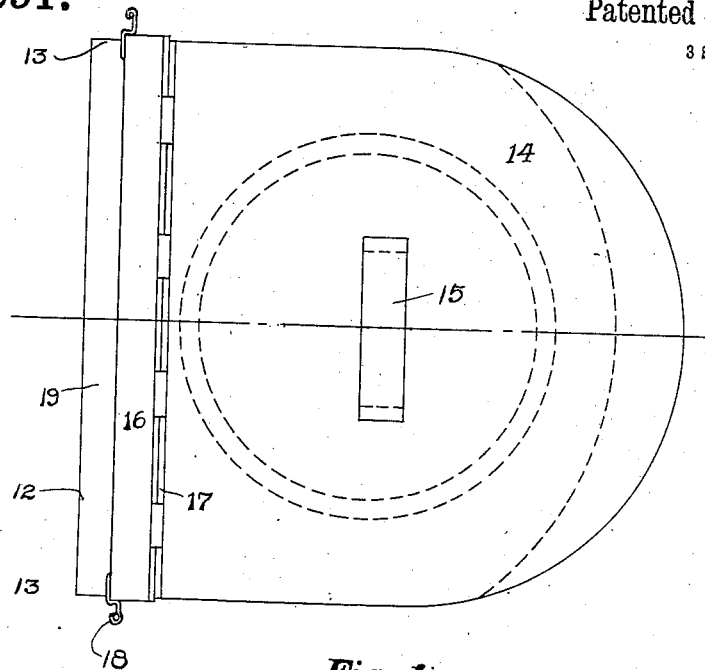

A. E. FOGELQUIST.
VENTILATED RECEPTACLE FOR COOKING UTENSILS.
APPLICATION FILED JULY 23, 1909.

961,291.

Patented June 14, 1910.
3 SHEETS—SHEET 1.

WITNESSES:

INVENTOR.
Alexander E. Fogelquist

A. E. FOGELQUIST.
VENTILATED RECEPTACLE FOR COOKING UTENSILS.
APPLICATION FILED JULY 23, 1909.

961,291.

Patented June 14, 1910.
3 SHEETS—SHEET 3.

WITNESSES:

INVENTOR.
Alexander E. Fogelquist

UNITED STATES PATENT OFFICE.

ALEXANDER E. FOGELQUIST, OF MINNEAPOLIS, MINNESOTA.

VENTILATED RECEPTACLE FOR COOKING UTENSILS.

961,291.  Specification of Letters Patent.  Patented June 14, 1910.

Application filed July 23, 1909. Serial No. 509,752.

*To all whom it may concern:*

Be it known that I, ALEXANDER E. FOGELQUIST, a citizen of the United States, residing at Minneapolis, county of Hennepin, and State of Minnesota, have invented a new and useful Ventilated Receptacle for Cooking Utensils; and I do hereby declare the following to be a full, clear, and exact specification thereof.

My invention relates to cooking utensils, and has for its object means for collecting and drawing into the combustion chamber of the stove, all steam, smoke, and odors arising from the cooking of food products in an ordinary utensil.

In attaining the object of my invention, I provide a receptacle adapted to receive and inclose a cooking utensil, and provided with a ventilator or opening communicating with the exterior atmosphere, and a draft passage communicating with the combustion chamber of the stove, whereby the natural suction of the combustion chamber and its flue will cause a current of air to circulate through the receptacle, passing through the draft passage and thence into the combustion chamber thereby drawing off all smoke, steam, and odors arising from the cooking.

An additional object of my invention is to provide a construction involving a base and a separable superstructure, one of the walls of the draft passage being secured to the base and the superstructure forming the other wall. Thus when the two portions are separated, the walls of the draft passage are openly exposed whereby any deposits of grease and other foreign substances may be readily removed from the walls of the passage.

A further object of my invention is to provide a hinged door or cover for the receptacle by which cooking utensils may be placed within same, or removed therefrom, and also enabling the operator to gain access to the cooking utensil without disturbing the action of the draft passage or allowing any smoke or odors to escape therefrom into the room. I also provide suitable windows in the side walls of the receptacle and in the door thereof, whereby a cooking utensil may be viewed by the operator without opening the door thereof.

My invention is applicable for various uses. However, it is readily seen that my invention is particularly adapted to receive all forms of cooking utensils, and the opening below the door portions thereof is particularly convenient for protruding handles such as formed on spiders or skillets. It is also to be noted that a skillet, spider, or kettle separately formed with draft passages, is of expensive construction, and a draft passage inclosed by walls which are formed integral with the cooking utensil is very difficult to clean; whereas, this invention provides a device adapted to utilize cooking utensils of ordinary construction, and the draft passage is readily accessible for cleansing.

To enable those skilled in the art to which my invention relates, to more fully comprehend the merits thereof, and to make or use the same, a particular embodiment of my invention is more fully set forth in the following specification and illustrated in the accompanying drawings. However, the actual scope of my invention is more particularly pointed out in the subjoined claims.

Figure 2:
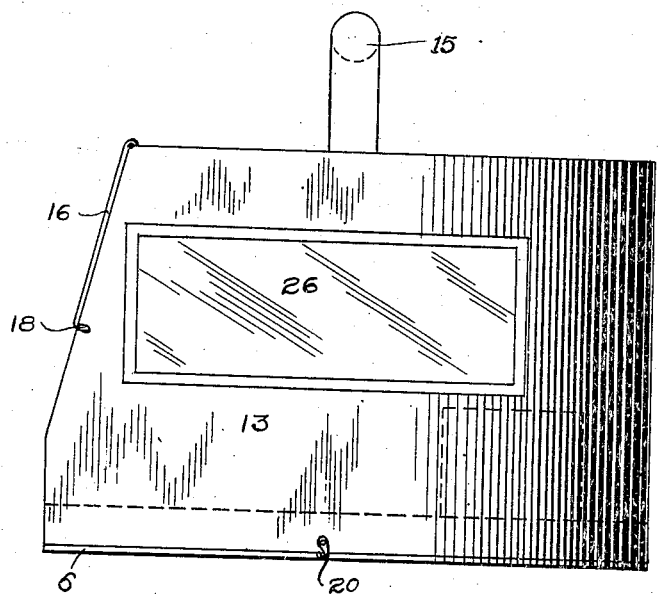
Figure 3:
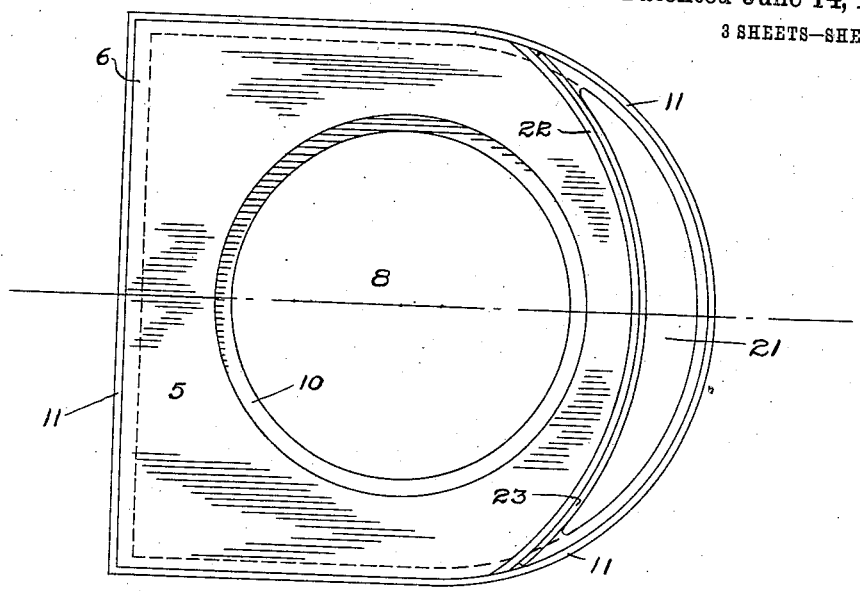
Figure 4:
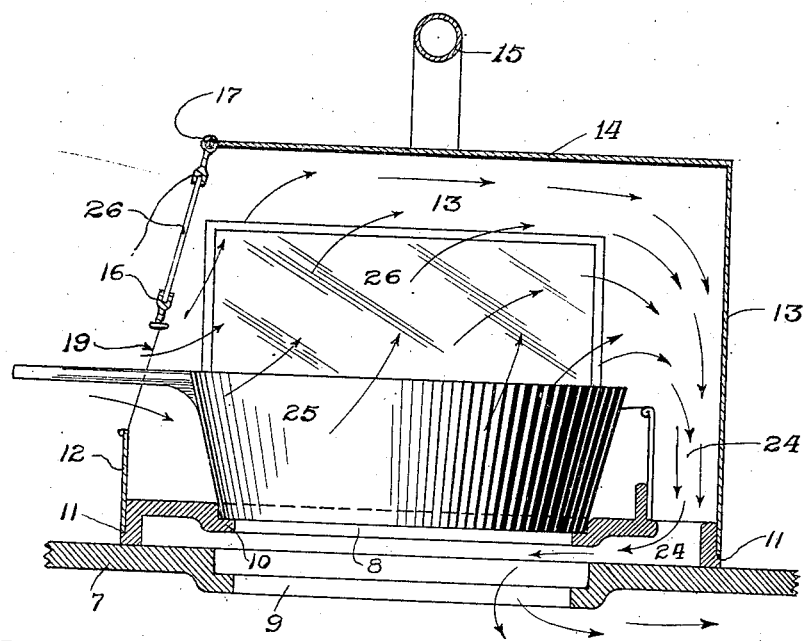
Figure 5:
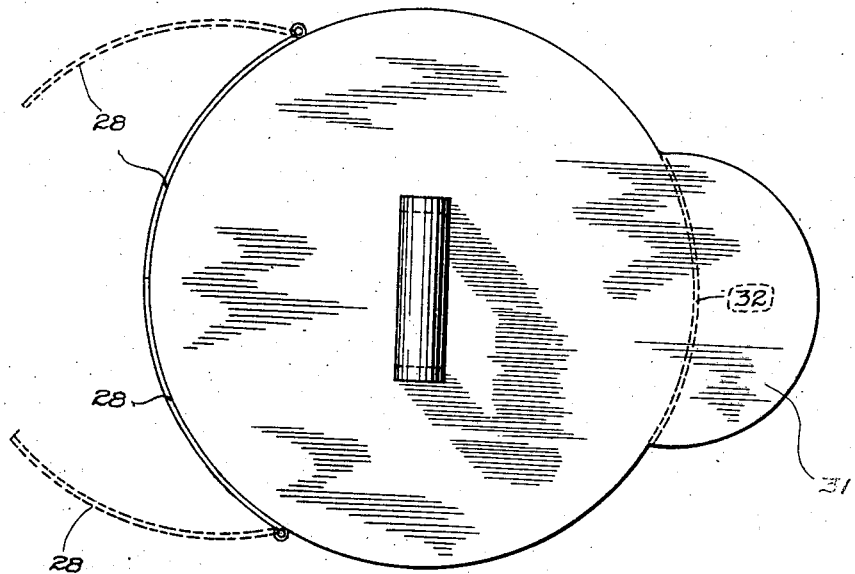
Figure 6:
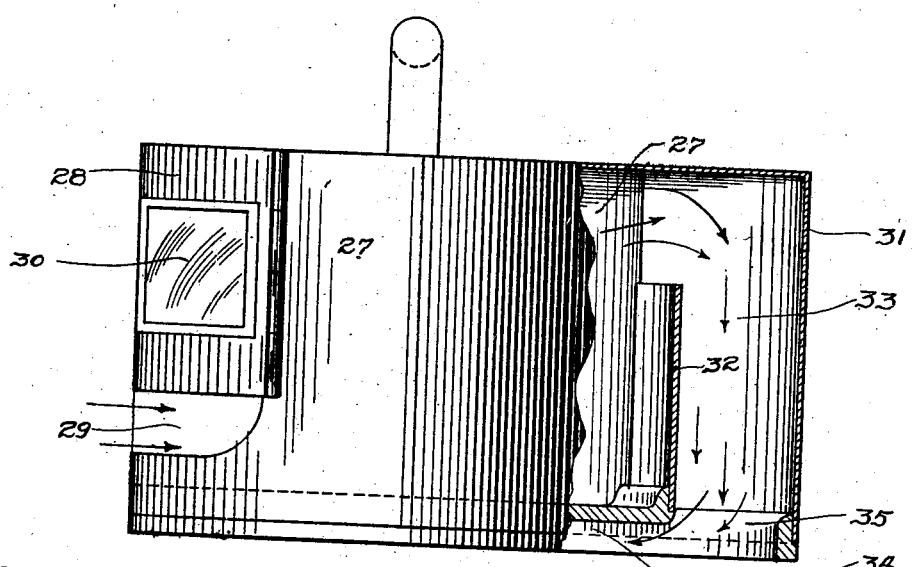

In the drawings: Figure 1 is a plan or top view of a device embodying my invention. Fig. 2 is an elevation thereof. Fig. 3 is a detail showing a plan of the base portion. Fig. 4 is a vertical longitudinal section taken on line 4—4 of Fig. 1, showing my improved device in use. Fig. 5 is a plan view of the device of the modified construction embodying my invention, being of practically circular configuration, and Fig. 6 is an elevation view thereof, a portion being shown in section.

Referring to the drawings in detail similar numerals of reference indicate like parts throughout the specification and the several views of the drawings.

As herein shown the base structure comprises a horizontal plate 5 provided at its outer edges with a downwardly extending rib 6 which is uniformly faced by which it may closely engage the upper plate 7 of the stove or range upon which the device is to be used. Near the center portion of the plate 5 I provide a circular opening 8 adapted to register with, and of a similar conformity to, the griddle opening 9 of the stove top, a flange 10 being provided similar to the flange of the griddle opening and adapted to support a cooking utensil. The outer edge of the base portion is provided with a shoulder 11 adapted to receive the lower edge of the walls of the receptacle, which comprises a short front wall 12, and the side walls 13 which extend rearwardly thereof, the extreme rear portion being bent to semi-circular form to correspond with the semi-circular rear portion of the base. The top portion 14 is provided with a handle 15 by which the device may be carried, and to the front edge thereof I secure a door 16 by any suitable means as the hinge 17. Said door 16 is provided with suitable catches 18 by which it may be retained in a closed position. An opening 19 is provided between the door 16 and the front wall 12 for the purposes hereinafter set forth. At the lower edge of the wall 13 and at either side thereof, I provide a suitable hook or catch 20 by which the receptacle may be secured to the base portion.

An opening 21 is provided in the rear portion of the base member at the edge of which I provide an upwardly extending flange 22, to which is secured an upwardly extending wall 23, the ends of which engage the side wall 13 thereby forming a draft passage 24 therebetween.

When in use, a skillet or other cooking utensil 25 may be placed over the opening 8 as shown in Fig. 4 of the drawings and the entire device arranged over the griddle opening 9, the heat from the combustion chamber is directly applied to the bottom of the skillet and the natural draft or suction within the combustion chamber draws a current of air through the opening 19 over the skillet or cooking utensil 25, through the draft passage 24, and thence into the combustion chamber, as indicated by the arrow points in Fig. 4. All smoke and odors are thus carried off, and it is found that when frying or cooking greasy substances, the gases generated therefrom and drawn into the combustion chamber will be quickly consumed thereby increasing the heat of the fire.

In the walls 13 and in the door 16 I provide suitable windows 26 formed of glass, mica, or other suitable substance, by which the contents of the cooking utensil may be viewed without removing same from the receptacle. By opening the door 16 the operator may gain access to the cooking utensil for the purpose of stirring or seasoning the foods without interfering with the action of the draft passage.

When not in use the upper portion may be disengaged from the base portion by which the respective walls of the draft passage are openly exposed for convenience of removing any deposits of grease or other foreign matter.

The above form of receptacle has been found more convenient for operation and for manufacture. However, this may be modified to the configuration set forth in the Figs. 5 and 6, in which the receptacle comprises a practically cylindrical wall 27 inclosing a suitable space for cooking-utensils, the doors 28 pivotally secured thereto and formed to an arc of the circle thereby corresponding with the cylindrical wall 27 when closed, in Fig. 5, the open positions of these doors being indicated in dotted lines, and a suitable base portion 35 adapted to the contour of said cylindrical wall and being otherwise, in all respects, similar to the base 5 hereinbefore referred to. An opening 29 is provided underneath the door 28 which corresponds to the opening 19 of the aforestated structure. If desired the doors 28 may be provided with windows 30, by which the contents of the receptacle may be viewed from without. The rear portion of the wall 27 is somewhat extended forming a partially cylindrical protuberance 31, which is adapted to coöperate with an upwardly extending flange 32, which is secured upon the base and adapted to separate the lower portion of the chamber within said protuberating portion from the inclosure within the receptacle, whereby a draft passage 33 is formed communicating between the upper portion of said inclosed chamber within the receptacle and the draft passage 34 formed throughout the base portion.

It is obvious from the foregoing that modifications may be effected within the scope of the appended claims without departing from the true and original purport of my invention. Therefore, I do not confine myself to the details of construction hereinbefore set forth.

Having thus described my invention what I claim and desire to secure by Letters Patent of the United States is the following:

1. A receptacle for cooking utensils, a base portion detachably secured thereto provided with an opening adapted to register with the griddle opening over which the device may be placed, an upwardly extending flange formed upon said base portion adapted to coöperate with the walls of the receptacle forming a draft passage by which communication is effected from the interior of the receptacle to said griddle opening, substantially for the purposes set forth.

2. A receptacle for cooking utensils, comprising an inclosed chamber adapted to receive cooking utensils, a base portion provided with an opening adapted to register with the griddle opening, and an upwardly extending wall formed on said base portion and coöperating with the walls of the receptacle thereby forming a draft passage extending from the upper portion of said chamber and adapted to communicate with the griddle opening thereunder, substantially for the purposes set forth.

3. In a receptacle for cooking utensils, an inclosed chamber adapted to receive cooking utensils, an upwardly extending wall secured to said base portion and coöperating with the walls of said receptacle thereby forming a draft passage extending from the upper portion of said inclosed chamber and communicating with the open lower portion underneath said chamber, and a ventilator communicating between the lower portion of said inclosed chamber and the exterior atmosphere, substantially for the purposes set forth.

4. In a receptacle for cooking utensils, the combination of a suitable inclosing wall, a base portion detachably secured thereto provided with a suitable opening adapted to receive a cooking utensil and to expose same to the heat of combustion thereunder, an upwardly extending wall secured to said base portion in coöperative spaced relation with said inclosing wall forming a draft passage communicating between the receptacle and the combustion chamber thereunder, and a door provided in said receptacle oppositely disposed to said draft passage, substantially for the purposes set forth.

5. In a receptacle for cooking utensils, the combination of inclosing walls, a base portion detachably secured thereto, and a wall portion extending upwardly from said base portion being suitably spaced from said inclosing walls, thereby forming a draft passage, substantially for the purposes set forth.

6. In a receptacle for cooking utensils, the combination of inclosing walls, a base portion detachably secured thereto, a draft passage formed throughout the base portion and extending between an upwardly extending wall of said base portion and one of said inclosing walls, and windows provided in said side walls whereby the contents of the receptacle may be viewed without removing same therefrom, substantially for the purposes set forth.

In testimony whereof I have hereunto set my hand and affixed my seal in the presence of the two subscribing witnesses this seventeenth day of July, 1909.

ALEXANDER E. FOGELQUIST. [L. S.]

Witnesses:
C. F. SNOW,
W. I. LARSON.